(12) United States Patent
Tsuruta et al.

(10) Patent No.: US 11,929,689 B2
(45) Date of Patent: Mar. 12, 2024

(54) POWER CONVERSION DEVICE

(71) Applicant: TOSHIBA MITSUBISHI-ELECTRIC INDUSTRIAL SYSTEMS CORPORATION, Chuo-ku (JP)

(72) Inventors: Ryoji Tsuruta, Chiyoda-ku (JP); Hiroshi Masunaga, Chuo-ku (JP); Tomohiro Tanaka, Chuo-ku (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 236 days.

(21) Appl. No.: 17/631,722

(22) PCT Filed: Sep. 13, 2019

(86) PCT No.: PCT/JP2019/036064
§ 371 (c)(1),
(2) Date: Jan. 31, 2022

(87) PCT Pub. No.: WO2021/048999
PCT Pub. Date: Mar. 18, 2021

(65) Prior Publication Data
US 2022/0286062 A1  Sep. 8, 2022

(51) Int. Cl.
*H02M 7/538* (2007.01)
*H02M 1/00* (2006.01)
(Continued)

(52) U.S. Cl.
CPC ..... *H02M 7/53871* (2013.01); *H02M 1/0009* (2021.05); *H02M 1/08* (2013.01); *H02M 1/38* (2013.01)

(58) Field of Classification Search
CPC ... H02M 1/38; H02M 1/0009; H02M 7/53871
See application file for complete search history.

(56) References Cited

U.S. PATENT DOCUMENTS

2007/0029959 A1* 2/2007 Ta ........................ H02M 1/38
  318/432
2015/0061639 A1  3/2015 Webster et al.
(Continued)

FOREIGN PATENT DOCUMENTS

EP  3 316 472 A1  5/2018
JP  10-56781 A  2/1998
(Continued)

OTHER PUBLICATIONS

Indian Office Action dated Jun. 30, 2022 in Indian Patent Application No. 202117059527, 5 pages.
(Continued)

*Primary Examiner* — Jue Zhang
*Assistant Examiner* — Lakaisha Jackson
(74) *Attorney, Agent, or Firm* — Oblon, McClelland, Maier & Neustadt, L.L.P.

(57) ABSTRACT

A power conversion device includes: a dead time application unit which applies a dead time to only one of a pair of pulse signals; a current polarity detection unit which detects a polarity of an output current; and a gate signal selection unit which, if the polarity of the output current is positive, selects the one pulse signal, to which the dead time has been applied, as a gate signal for a positive arm and selects the other pulse signal as a gate signal for a negative arm, and, if the polarity of the output current is negative, selects the one pulse signal, to which the dead time has been applied, as the gate signal for the negative arm and selects the other pulse signal as the gate signal for the positive arm.

7 Claims, 12 Drawing Sheets

(51) Int. Cl.
*H02M 1/08* (2006.01)
*H02M 1/38* (2007.01)
*H02M 7/5387* (2007.01)

(56) References Cited

U.S. PATENT DOCUMENTS

2017/0110999 A1    4/2017  Shimada et al.
2017/0117821 A1*   4/2017  Kato ................. H02M 7/53871
2019/0334456 A1   10/2019  Kashima
2020/0395881 A1*  12/2020  Hanioka ............... H02P 27/085

FOREIGN PATENT DOCUMENTS

| JP | 2002-142466 A | 5/2002 |
| JP | 4621013 B2 | 1/2011 |
| WO | WO 2015/159694 A1 | 10/2015 |

OTHER PUBLICATIONS

International Search Report dated Nov. 26, 2019 in PCT/JP2019/036064 filed on Sep. 13, 2019 (1 page).

* cited by examiner

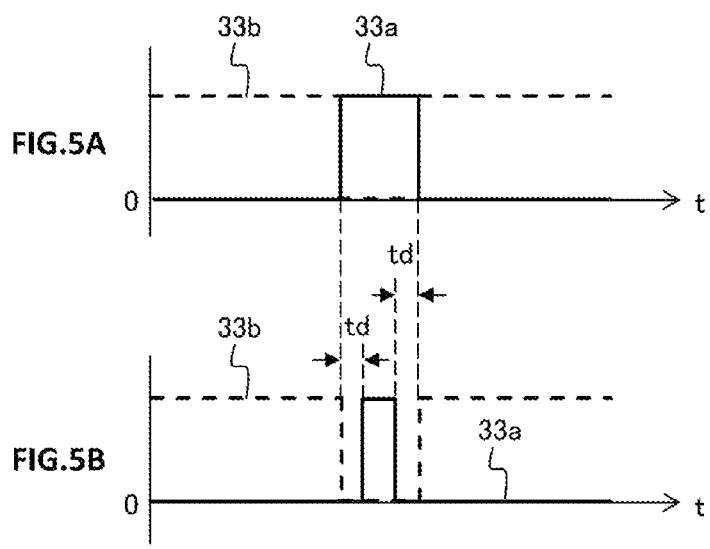
FIG.5A
FIG.5B
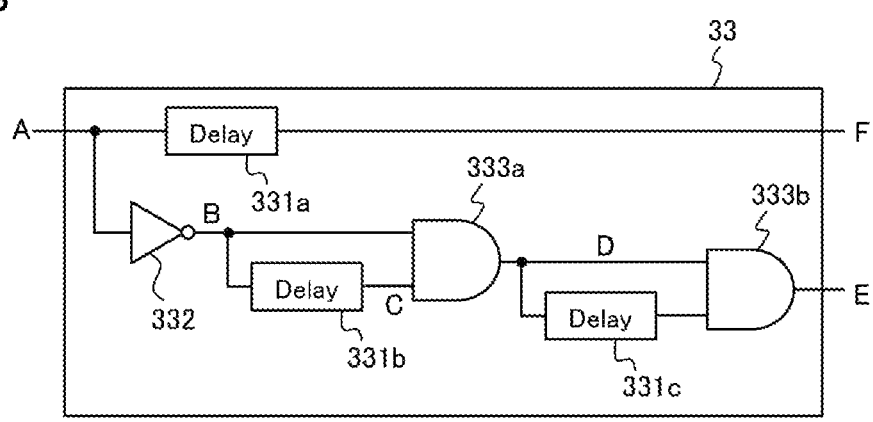
FIG.6

POWER CONVERSION DEVICE

TECHNICAL FIELD

The present disclosure relates to a power conversion device.

BACKGROUND ART

In order to supply power from a power supply to a load such as a motor, a power conversion device is connected between the power supply and the load. Examples of such a power conversion device include an inverter having: an input terminal to which a DC power supply is connected; and an output terminal to which a load to be driven by means of AC current is connected. The inverter converts DC voltage supplied to the input terminal into high-frequency AC voltage with use of an inverter circuit.

In the inverter circuit, two arms each having a semiconductor switching element and a diode connected in antiparallel to the semiconductor switching element are connected in series. The semiconductor switching elements of the two arms are each controlled to be ON or OFF by means of a gate signal, whereby DC input power is converted into AC output power. When one of the two semiconductor switching elements is ON, the other semiconductor switching element is OFF. However, it is not possible to instantly make switching between ON and OFF. Therefore, both semiconductor switching elements may assume ON states, whereby excessive short-circuit current might flow. In order to prevent the short-circuit current, a time during which both semiconductor switching elements are kept OFF at the time of switching between ON and OFF of the semiconductor switching elements, is set. This time is called dead time.

Conventionally, the dead time is set to be present at a pulse turn-on time. Therefore, there is a period during which an OFF state is maintained although, in this period, an ON state would be assumed with an original gate signal for a semiconductor switching element. An output voltage error relative to a voltage command value occurs owing to the dead time. As a means for reducing the output voltage error, compensation for a dead time is performed according to the polarity of an output current in a conventional power conversion device (see, for example, Patent Document 1).

CITATION LIST

Patent Document

Patent Document 1: Japanese Laid-Open Patent Publication No. 10-56781

SUMMARY OF THE INVENTION

Problems to be Solved by the Invention

In the case where an output voltage error occurs by setting a dead time in a power conversion device including two arms, the arms are divided, according to the polarity of an output current, into: an arm that is subjected to occurrence of the output voltage error; and an arm that is not subjected to occurrence of the output voltage error. As a result, in the conventional power conversion device in which compensation for the dead time is performed, the dead time is applied to a gate signal for the semiconductor switching element of the arm that is subjected to occurrence of an output voltage error.

Meanwhile, switching between ON and OFF of a semiconductor switching element is not instantly made, and there is a time required for the switching between ON and OFF. If the switching between ON and OFF is made in a time shorter than the time required for the switching between ON and OFF, operation of the semiconductor switching element becomes unstable, and switching control may not be performed according to a command in the form of a gate signal.

In the conventional power conversion device, the dead time is applied to the gate signal for the semiconductor switching element of the arm that is subjected to occurrence of an output voltage error. In this case, a pulse width in the gate signal to which the dead time has been applied is narrowed. If this leads to a pulse width shorter than the time required for the switching between ON and OFF, operation of the semiconductor switching element may become unstable, and it may become difficult to suppress an output voltage error caused by the dead time.

The present disclosure has been made to solve the above problems, and an object of the present disclosure is to provide a power conversion device in which an output voltage error due to a dead time can be suppressed even if a pulse width in a gate signal is narrowed.

Solution to the Problems

A power conversion device according to the present disclosure includes: a positive input terminal and a negative input terminal connected to an external DC power supply; a positive arm and a negative arm connected in series between the positive input terminal and the negative input terminal, each of the positive arm and the negative arm including a semiconductor switching element and a diode connected in antiparallel to the semiconductor switching element; an output terminal connected to a connection point between the positive arm and the negative arm; a current detection unit configured to detect an output current outputted to the output terminal; a drive unit configured to drive the semiconductor switching element of each of the positive arm and the negative arm by means of a gate signal; and a control unit configured to control the gate signal. The control unit includes: a pulse signal generation unit configured to generate a pulse signal on the basis of a voltage command value and a carrier signal; a dead time application unit configured to add a time width of a dead time to, or subtract the time width from, a pulse width in one pulse signal out of the pulse signal generated by the pulse signal generation unit and a pulse signal resulting from reversing the pulse signal, to apply the dead time to only the one pulse signal; a current polarity detection unit configured to detect, on the basis of the output current detected by the current detection unit, a polarity of the output current; and a gate signal selection unit configured to, if the polarity of the output current detected by the current polarity detection unit is positive, select the one pulse signal, to which the dead time has been applied, as a gate signal for the positive arm and select another one of the pulse signals, to which the dead time has not been applied, as a gate signal for the negative arm, and, if the polarity of the output current detected by the current polarity detection unit is negative, select the one pulse signal, to which the dead time has been applied, as the gate signal for the negative arm and select the other pulse signal, to which the dead time has not been applied, as the gate signal for the positive arm.

Effect of the Invention

In the power conversion device according to the present disclosure, if the polarity of the output current is positive, the one pulse signal to which the dead time has been applied is selected as a gate signal for the positive arm and the other pulse signal to which the dead time has not been applied is selected as a gate signal for the negative arm, and, if the polarity of the output current is negative, the one pulse signal to which the dead time has been applied is selected as the gate signal for the negative arm and the other pulse signal to which the dead time has not been applied is selected as the gate signal for the positive arm. Consequently, an output voltage error due to a dead time can be suppressed even if a pulse width in a gate signal is narrowed.

BRIEF DESCRIPTION OF THE DRAWINGS

FIG. 5A and FIG. 5B are diagrams for explaining a pulse signal to which a dead time has been applied, in embodiment 1, FIG. 6 is a configuration diagram of a dead time application unit in embodiment 1.

DESCRIPTION OF EMBODIMENTS

Figure 1:
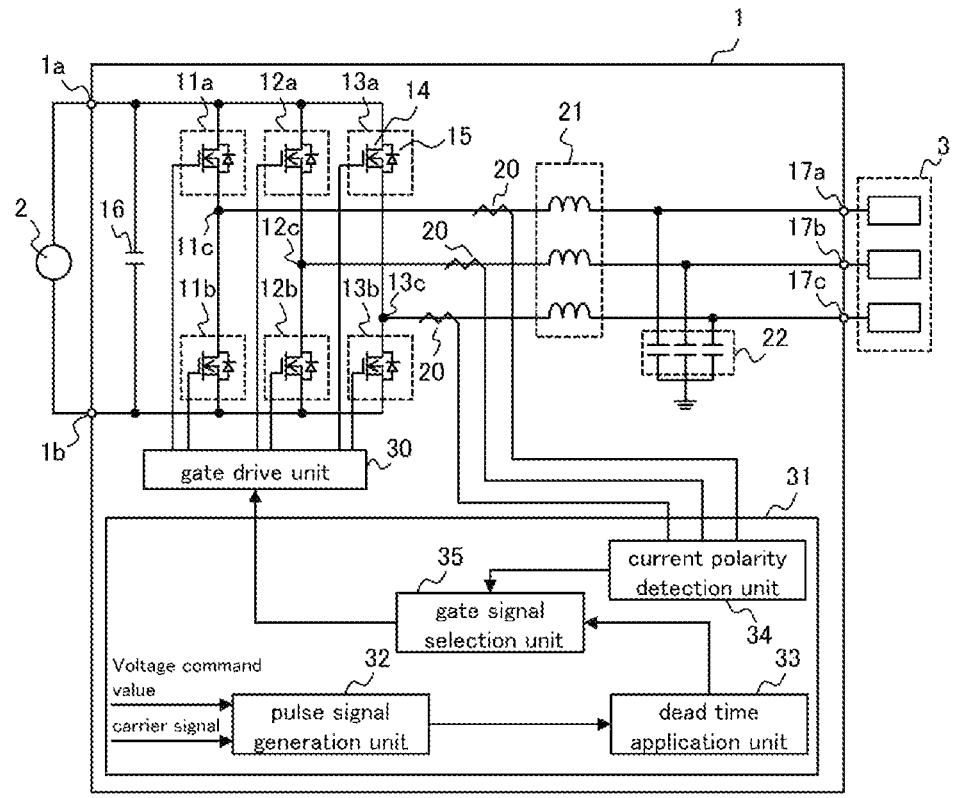
FIG. 1 is a configuration diagram of a power conversion device according to embodiment 1.

Hereinafter, power conversion devices according to embodiments for carrying out the present disclosure will be described in detail with reference to the drawings. In the drawings, the same or corresponding parts are denoted by the same reference characters.

FIG. 1 is a configuration diagram of a power conversion device according to embodiment 1. The power conversion device according to the present embodiment is an inverter as an example of the power conversion device. The inverter has a function of converting inputted DC power into high-frequency AC power and outputting the AC power.

In FIG. 1, a power conversion device 1 according to the present embodiment includes a positive input terminal 1a and a negative input terminal 1b connected to an external DC power supply 2. Between the positive input terminal 1a and the negative input terminal 1b, a positive arm 11a and a negative arm 11b are connected in series, a positive arm 12a and a negative arm 12b are connected in series, and a positive arm 13a and a negative arm 13b are connected in series. Each of the positive arms 11a, 12a, and 13a and the negative arms 11b, 12b, and 13b is composed of a semiconductor switching element 14 and a flyback diode 15 connected in antiparallel to the semiconductor switching element 14. A combination of each positive arm and the corresponding negative arm connected in series is referred to as one leg. In the power conversion device 1 according to the present embodiment, three legs are connected in parallel. Since the three legs are connected in parallel, a so-called three-phase bridge circuit is formed. Further, a capacitor 16 is connected between the positive input terminal 1a and the negative input terminal 1b.

As each semiconductor switching element 14, a semiconductor switching element such as an insulated-gate bipolar transistor (IGBT) or a metal-oxide-semiconductor field-effect transistor (MOSFET) can be used. As the capacitor 16, an electrolytic capacitor, a film capacitor, or the like can be used.

A connection point 11c between the positive arm 11a and the negative arm 11b is connected to an output terminal 17a. A connection point 12c between the positive arm 12a and the negative arm 12b is connected to an output terminal 17b. A connection point 13c between the positive arm 13a and the negative arm 13b is connected to an output terminal 17c. Three-phase AC power is outputted to the output terminals 17a, 17b, and 17c. It is noted that, in the case of a power conversion device in which single-phase AC current is outputted, the power conversion device has a configuration in which two legs each of which is a combination of a positive arm and a negative arm connected in series are connected in parallel.

A current sensor 20, a filter reactor 21, and a filter capacitor 22 are connected between the connection point 11c and the output terminal 17a. A current sensor 20, a filter reactor 21, and a filter capacitor 22 are connected between the connection point 12c and the output terminal 17b. A current sensor 20, a filter reactor 21, and a filter capacitor 22 are connected between the connection point 13c and the output terminal 17c. The current sensors 20 detect output currents flowing between the connection points 11c, 12c, and 13c and the output terminals 17a, 17b, and 17c. As the filter reactors 21, a three-phase reactor in which phases are magnetically coupled to each other may be used, or three single-phase reactors may be used. The filter capacitors 22 are connected in a star configuration having the capacitors in the respective phases. Although a neutral point of the star configuration of the filter capacitors 22 is grounded in FIG. 1, the neutral point may be or does not have to be grounded. Further, loads 3 are connected to the output terminals 17a, 17b, and 17c. The power conversion device 1 according to the present embodiment will be described on an assumption that operation is performed such that a power factor at which active power flows in a direction from the positive input terminal 1*a* and the negative input terminal 1*b* via the output terminals 17*a*, 17*b*, and 17*c* to the loads 3, is 1.

In the power conversion device 1, output voltage is controlled by controlling ON and OFF of the six semiconductor switching elements 14. Each of the six semiconductor switching elements 14 is driven by means of a gate signal transmitted from a gate drive unit 30. The gate signal is controlled by a control unit 31.

The control unit 31 includes a pulse signal generation unit 32, a dead time application unit 33, a current polarity detection unit 34, and a gate signal selection unit 35. The pulse signal generation unit 32 generates a pulse signal on the basis of a voltage command value and a carrier signal. The dead time application unit 33 generates a pulse signal resulting from reversing the pulse signal generated by the pulse signal generation unit 32, to generate a pair of pulse signals. Then, the dead time application unit 33 adds a time width of a dead time to, or subtracts the time width from, a pulse width in one of the pulse signals, to apply the dead time to only the one pulse signal. The current polarity detection unit 34 detects, on the basis of an output current detected by a corresponding current sensor 20, a polarity of the output current. If the polarity of the output current detected by the current polarity detection unit 34 is positive, the gate signal selection unit 35 selects the one pulse signal, to which the dead time has been applied by the dead time application unit 33, as a gate signal for the positive arm and selects another one of the pulse signals as a gate signal for the negative arm. Meanwhile, if the polarity of the output current detected by the current polarity detection unit 34 is negative, the gate signal selection unit 35 selects the one pulse signal, to which the dead time has been applied by the dead time application unit 33, as the gate signal for the negative arm and selects the other pulse signal as the gate signal for the positive arm.

Next, each component of the control unit 31 will be described in detail.

Figure 2:
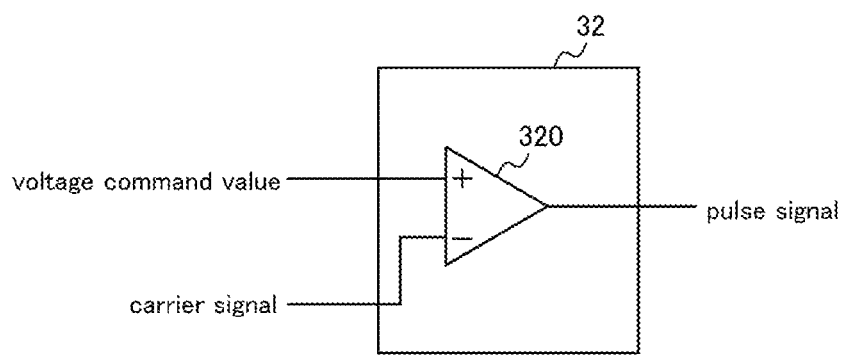
FIG. 2 is a configuration diagram of a pulse signal generation unit in embodiment 1.

FIG. 2 is a configuration diagram of the pulse signal generation unit. The pulse signal generation unit 32 includes a comparator 320. The comparator 320 compares the magnitudes of a carrier signal and a standardized voltage command value which is a modulation signal, to generate a pulse signal for turning on or off the semiconductor switching element. The positive arm and the negative arm of each one of the legs alternately repeat an ON/OFF operation. Therefore, when one of the arms is ON, the other arm is OFF. That is, the output from the comparator 320 is a pulse signal for the positive arm of the one leg, whereas the pulse signal resulting from reversing the output from the comparator 320 is a pulse signal for the negative arm. One pulse signal generation unit 32 is provided to each one of the legs.

Figure 3:
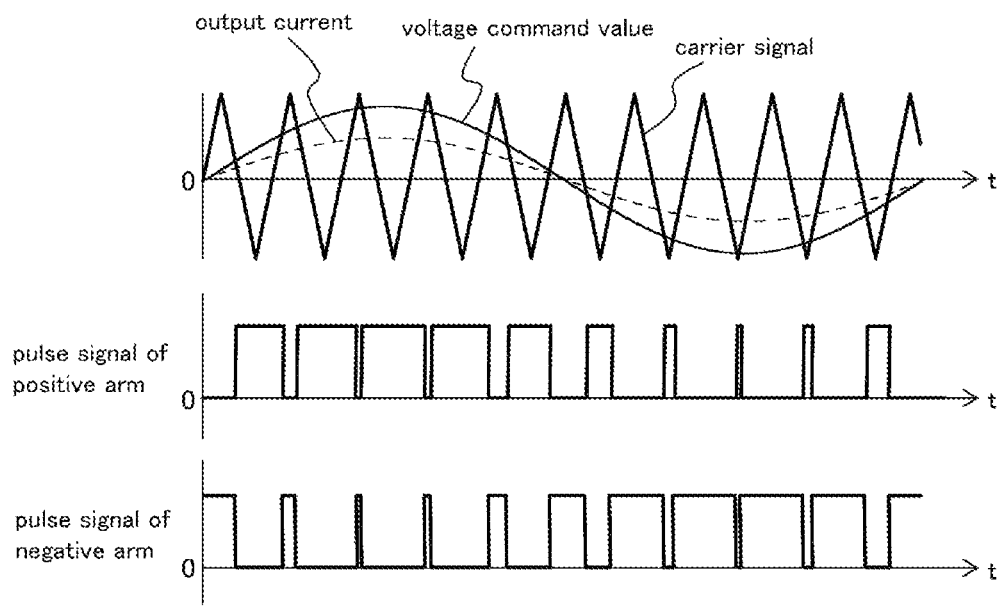
FIG. 3 is a diagram showing pulse signals in embodiment 1.

FIG. 3 is a diagram explaining the relationship between the pulse signal for the positive arm outputted by the comparator 320 and each of the voltage command value and the carrier signal. It is noted that FIG. 3 further shows the pulse signal for the negative arm outputted from a reversal circuit of the dead time application unit 33 (described later) as well. A sine wave is used as the voltage command value. A triangular wave is used as the carrier signal. The comparator 320 compares the magnitudes of the voltage command value and the carrier signal with each other. Then, if the magnitude of the voltage command value is larger than the magnitude of the carrier signal, the comparator 320 performs control such that the pulse signal for the positive arm is ON. Meanwhile, the reversal circuit of the dead time application unit 33 performs control such that the pulse signal for the negative arm is OFF when the pulse signal for the positive arm is ON. Such a control method is generally called pulse width modulation (PWM) control. In the three-phase power conversion device, three pulse signals on the basis of which the semiconductor switching elements of the positive arms and the negative arms of the three legs are driven are generated by the pulse signal generation units 32 on the basis of voltage command values and carrier signals in the respective phases, i.e., a U phase, a V phase, and a W phase. Each semiconductor switching element is turned on one time and turned off one time within one cycle of a triangular wave as a carrier signal. Therefore, the frequency of the carrier signal and the switching frequency of the semiconductor switching element coincide with each other.

Figure 4A:
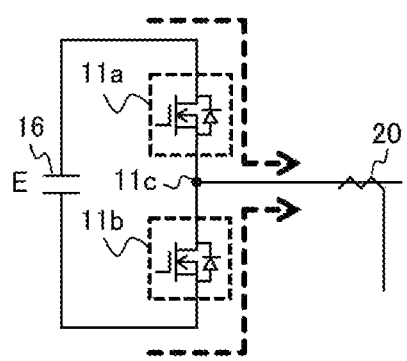
FIG. 4 is a FIG. 4A and FIG. 4B are diagrams for explaining the relationship between the polarity of an output current and a voltage error in embodiment 1.
Figure 4B:
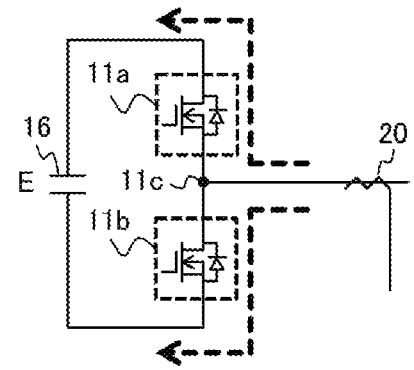

FIG. 4A and FIG. 4B are diagrams for explaining the relationship between the polarity of an output current and a voltage error each one of the legs. The voltage of the capacitor 16 is represented by E. An output current flowing from the connection point 11*c* between the positive arm 11*a* and the negative arm 11*b* to the output terminal side is detected by the corresponding current sensor 20. In FIG. 4A and FIG. 4B, thick broken lines indicate the flow of the current. It is noted that the following explanation of FIG. 4A and FIG. 4B pertains to the relationship between the polarity of the output current and the voltage error in the case where a dead time is applied to a gate signal for the switching element of each of the positive arm 11*a* and the negative arm 11*b*.

As shown in FIG. 4A, in the case where the output current flowing from the connection point 11*c* between the positive arm 11*a* and the negative arm 11*b* to the output terminal side is positive, when the semiconductor switching element of the positive arm 11*a* is ON, a voltage of +E/2 is outputted to the output terminal side. Meanwhile, in a period during which the semiconductor switching element of the positive arm 11*a* is not ON, the current flows via the flyback diode of the negative arm 11*b*, and thus a voltage of −E/2 is outputted to the output terminal side. Therefore, in the case where the output current is positive, if the semiconductor switching element of the positive arm 11*a* is OFF owing to a dead time when a command that would otherwise turn on the semiconductor switching element is given, the output voltage becomes −E/2 instead of +E/2. Meanwhile, the negative arm 11*b* is as follows. That is, in the case where the output current is positive, the current flows via the flyback diode of the negative arm 11*b* regardless of whether the semiconductor switching element is ON or OFF. Therefore, in the case where the output current is positive, the output voltage is dependent on ON/OFF of the semiconductor switching element of the positive arm 11*a*. As a result, the only arm to be influenced by a gate signal having a pulse width that differs from that in an original gate signal owing to the dead time is the positive arm 11*a*, and the negative arm 11*b* is not influenced. As described above, in the case where the output current is positive, there is a period during which the semiconductor switching element of the positive arm 11*a* is OFF owing to the dead time when the semiconductor switching element should otherwise be ON. The output voltage in s period is −E/2 although the output voltage should otherwise be +E/2. Therefore, the magnitude of the voltage error that occurs in this period is (−E/2)−(+E/2)=−E.

As shown in FIG. 4B, in the case where the output current flowing from the connection point 11*c* between the positive arm 11*a*, and the negative arm 11*b* to the output terminal side is negative, a phenomenon contrary to that in the case where the output current is positive occurs. That is, in the case where the output current is negative, the output voltage is dependent on ON/OFF of the semiconductor switching element of the negative arm 11b. As a result, the only arm to be influenced by the gate signal having the pulse width that differs from that in the original gate signal owing to the dead time is the negative arm 11b, and the positive arm 11a is not influenced, in the case where the output current is negative, there is a period during which the semiconductor switching element of the negative arm 11b is OFF owing to the dead time when the semiconductor switching element should otherwise be ON. The output voltage in this period is +E/2 although the output voltage should otherwise be −E/2. Therefore, the magnitude of the voltage error that occurs in this period is (+E/2)−(−E/2)=+E.

The power conversion device according to the present embodiment focuses on a factor in occurrence of such a voltage error in each one of the legs and selects, according to the polarity of the output current, an arm to which a gate signal to which a dead time has been applied is to be transmitted.

FIG. 5A and FIG. 5B are diagrams for explaining a pulse signal to which a dead time has been applied. Hereinafter, the dead time is written as td. FIG. 5A shows a pulse signal for turn-off and a pulse signal for turn-on before application of the dead time, A solid line indicates a pulse signal for turn-on 33a, and a broken line indicates a pulse signal for turn-off 33b. FIG. 5B shows a pulse signal for turn-off 33b and a pulse signal for turn-on 33a after application of the dead time. FIG. 5B shows an example in which no dead time is applied to the pulse signal for turn-off 33b indicated by a broken line and the dead time is applied to the pulse signal for turn-on 33a indicated by a solid line. As shown in FIG. 5B, rising of the pulse signal for turn-on 33a is lagged by the dead time td, and falling thereof is advanced by the dead time td. In this manner, application of the dead time means that: rising of the pulse signal for turn-on is lagged by the dead time td; and falling of the said pulse signal is advanced by the dead time td. That is, the pulse signal for turn-on to which the dead time has been applied has a narrowed pulse width. It is noted that delaying (shifting) of a pulse signal by the dead time described later is not regarded as application of the dead time.

FIG. 6 is a configuration diagram of the dead time application unit 33. The pulse signal generated by the pulse signal generation unit 32 is divided into two pulse signals. One of the pulse signals is outputted as a pulse signal for turn-off delayed by the dead time at a delay circuit 331a. The other pulse signal is reversed by a reversal circuit 332, and the obtained pulse signal is transmitted to a delay circuit 331b and an AND circuit 333a to obtain a pulse signal for turn-on to which the dead time has been applied at falling. Further, this pulse signal is transmitted to a delay circuit 331c and an AND circuit 333b to obtain a pulse signal for turn-on to which the dead time has been applied at rising.

Figure 7:
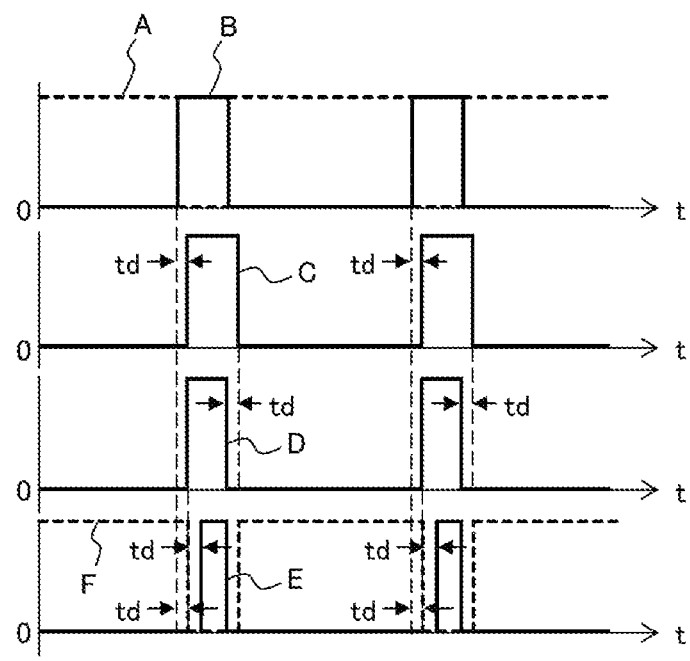
FIG. 7 is a diagram for explaining pulse signals in the dead time application unit in embodiment 1.

FIG. 7 is a diagram showing pulse signals at the positions A, B, C, D, E, and F in FIG. 6. In FIG. 7, a pulse signal A indicated by a broken line is a pulse signal inputted to the dead time application unit 33 at the position A in FIG. 6. A pulse signal B indicated by a solid line is a pulse signal resulting from reversing the pulse signal A at the position B in FIG. 6. A pulse signal C indicated by a solid line is a pulse signal resulting from delaying the pulse signal B by the dead time td at the position C in FIG. 6. A pulse signal D indicated by a solid line is a pulse signal resulting from advancing falling of the pulse signal C by the dead time td at the position D in FIG. 6. A pulse signal E indicated by a solid line is a pulse signal resulting from lagging rising of the pulse signal D by the dead time td at the position E in FIG. 6. A pulse signal F indicated by a broken line is a pulse signal resulting from delaying the pulse signal A by the dead time td at the position F in FIG. 6. The dead time application unit 33 outputs the pulse signal E and the pulse signal F. That is, the dead time application unit 33 applies the dead time to only one of the pair of pulse signals and does not apply the dead time to the other pulse signal. It is noted that the one dead time application unit 33 shown in FIG. 6 is provided to each one of the arms. Although the pulse signal E and the pulse signal F outputted by the dead time application unit 33 have been delayed by the dead time behind the pulse signal A and the pulse signal B, this delay time is sufficiently shorter than the frequency of the voltage command value, and thus inflicts little influence.

It is noted that, although the pulse signal generation unit 32 generates one pulse signal and the reversal circuit 332 of the dead time application unit 33 reverses the pulse signal so that a pair of pulse signals are generated in the present embodiment, the pulse signal generation unit 32 may include the reversal circuit and generate a pair of pulse signals, and the pulse signals may be transmitted to the dead time application unit 33.

Figure 8:
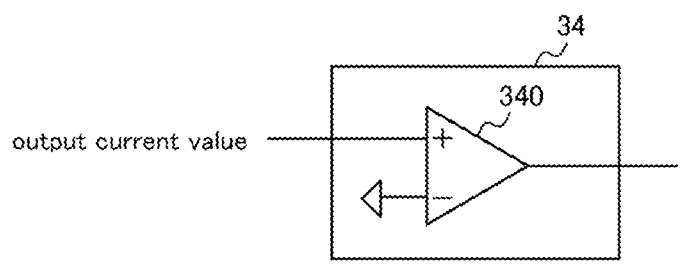
FIG. 8 is a configuration diagram of a current polarity detection unit in embodiment 1.

FIG. 8 is a configuration diagram of the current polarity detection unit 34. The current polarity detection unit 34 includes a comparator 340. The comparator 340 performs comparison for the relationship in magnitude between 0 and the output current value detected by the current sensor 20. If the output current value is larger than 0, i.e., if the current polarity is positive, the comparator 340 outputs 1. Meanwhile, if the output current value is equal to or smaller than 0, i.e., if the current value is 0 or the current polarity is negative, the comparator 340 outputs 0. The current polarity detection unit 34 shown in FIG. 8 is provided correspondingly to each of the three current sensors.

Figure 9:
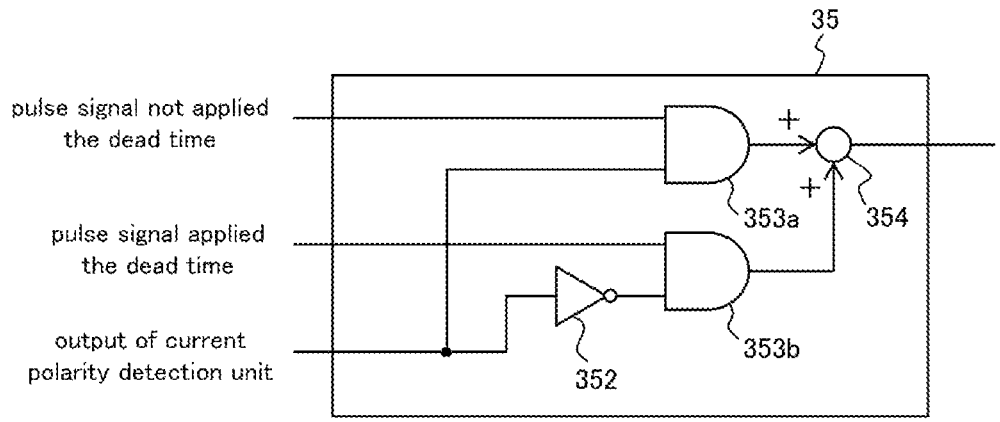
FIG. 9 is a configuration diagram of a gate signal selection unit embodiment 1.

FIG. 9 is a configuration diagram of the gate signal selection unit 35. The gate signal selection unit 35 includes a reversal circuit 352, two AND circuits 353a and 353b, and an adder 354. The AND circuit 353a receives: the pulse signal to which the dead time has not been applied; and the output from the current polarity detection unit 34. The AND circuit 353b receives: the pulse signal to which the dead time has been applied; and the output from the current polarity detection unit 34 reversed by the reversal circuit 352. The adder 354 adds up the outputs from the two AND circuits 353a and 353b and outputs the sum to the gate drive unit 30. It is noted that the gate signal selection unit 35 shown in FIG. 9 is provided correspondingly to each arm. It is noted that the gate signal selection unit 35 shown in FIG. 9 is adapted to the positive arm, and, in a gate signal selection unit adapted to the negative arm, the reversal circuit 352 is provided not on the AND circuit 353b side but on the AND circuit 353a side.

The gate signal selection unit 35 (shown in FIG. 9) provided to the positive arm is such that: if the polarity of the output current detected by the current polarity detection unit 34 is positive, the pulse signal to which the dead time has not been applied is selected as a gate signal; and, if the polarity of the output current detected by the current polarity detection unit 34 is negative, the pulse signal to which the dead time has been applied is selected as a gate signal. Meanwhile, in the gate signal selection unit 35 provided to the negative arm, the reversal circuit 352 is provided on the AND circuit 353a side, and thus the gate signal selection unit 35 is such that: if the polarity of the output current detected by the current polarity detection unit 34 is positive, the pulse signal to which the dead time has been applied is selected as a gate signal; and, if the polarity of the output current detected by the current polarity detection unit 34 is negative, the pulse signal to which the dead time has not been applied is selected as a gate signal.

That is, the gate signal selection units 35 are such that, if the polarity of the output current is positive, the pulse signal to which the dead time has not been applied is selected as a gate signal for the positive arm that could be a factor in a voltage error, and the pulse signal to which the dead time has been applied is selected as a gate signal for the negative arm that could not be a factor in a voltage error. Meanwhile, the gate signal selection units 35 are such that, if the polarity of the output current is negative, the pulse signal to which the dead time has not been applied is selected as a gate signal for the negative arm that could be a factor in a voltage error, and the pulse signal to which the dead time has been applied is selected as a gate signal for the positive arm that could not be a factor in a voltage error.

In the power conversion device according to the present embodiment, the polarity of an output current is detected, and a pulse signal to which the dead time has been applied is selected as a gate signal for one of the arms that could not be a factor in a voltage error. Therefore, even if the pulse width in the gate signal is narrowed and operation of the semiconductor switching element becomes unstable, the instability could not be the cause of a voltage error since current flows via the flyback diode in the arm that could not be a factor in a voltage error.

The power conversion device configured as described above is such that an output voltage error due to a dead time can be suppressed even if a pulse width in a gate signal is narrowed owing to application of the dead time.

It is noted that the present embodiment employs a method in which the dead time is applied to one of the pair of pulse signals by the dead time application unit 33, and then a gate signal for the positive arm and a gate signal for the negative arm are selected by the gate signal selection unit 35 from between the pair of pulse signals. The present embodiment may employ, as another method, a method in which a gate signal for the positive arm and a gate signal for the negative arm are selected by the gate signal selection unit 35 from between the pair of pulse signals before application of the dead time, and then the dead time is applied to one of the pair of pulse signals by the dead time application unit 33. For example, if the polarity of the output current detected by the current polarity detection unit 34 is positive, the gate signal selection unit 35 selects, as a gate signal for the positive arm, one pulse signal out of the pulse signal generated by the pulse signal generation unit 32 and the pulse signal resulting from reversing the pulse signal, and selects the other pulse signal as a gate signal for the negative arm. Meanwhile, if the polarity of the output current detected by the current polarity detection unit 34 is negative, the gate signal selection unit 35 selects the one pulse signal as a gate signal for the negative arm and selects the other pulse signal as a gate signal for the positive arm. Then, the dead time application unit 33 adds the time width of the dead time to, or subtracts the time width from, the pulse width in the one pulse signal selected by the gate signal selection unit 35, to apply the dead time to the said one pulse signal. In the case of employing this method as well, the pulse signal to which the dead time has been applied can be selected as a gate signal for an arm that could not be a factor in a voltage error.

Embodiment 2

The dead time application unit of the power conversion device according to embodiment 1 has been described with a circuit configuration shown in FIG. 6. In a power conversion device according to embodiment 2, the dead time is applied to a pulse signal by using a carrier signal in the form of a triangular wave. The components of the power conversion device according to the present embodiment other than the pulse signal generation unit and the dead time application unit are the same as those of the power conversion device according to embodiment 1.

Figure 10:
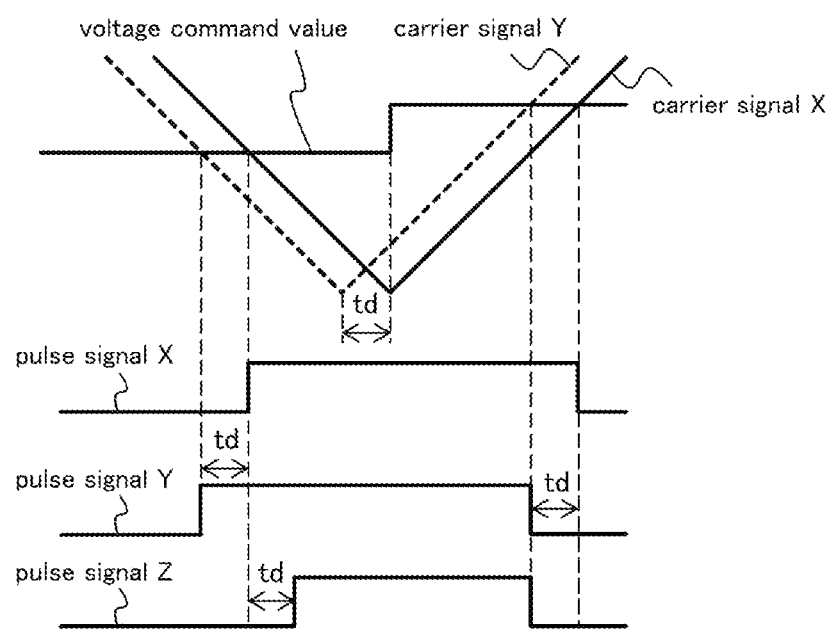
FIG. 10 is a diagram for explaining a dead me application method in which a carrier signal is used, in embodiment 2.

FIG. 10 is a diagram for explaining a method for applying the dead time by using the carrier signal in the form of a triangular wave. The carrier signal in the present embodiment is a triangular wave. Meanwhile, the voltage command value is not a sine wave but a rectangular wave having a voltage value updated at tops and bottoms of the carrier signal. The pulse signal generation unit compares the magnitudes of the carrier signal and the voltage command value with each other, to generate a pulse signal. The pulse signal generation unit in the present embodiment generates a carrier signal Y having a phase advanced by the dead time td relative to an initial-value carrier signal X. Further, the pulse signal generation unit outputs: a pulse signal X generated through comparison between the magnitudes of the initial-value carrier signal X and the voltage command value; and a pulse signal Y generated through comparison between the magnitudes of the carrier signal Y and the voltage command value.

Figure 11:
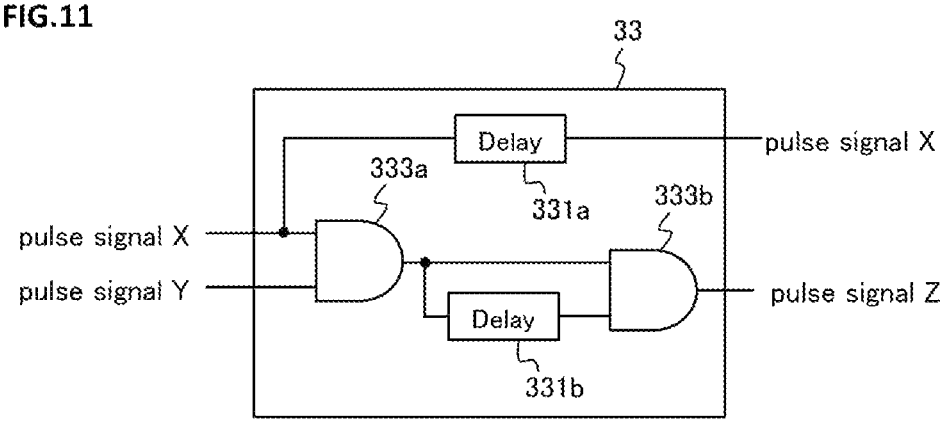
FIG. 11 is a configuration diagram of a dead time application unit in embodiment 2.

FIG. 11 is a configuration diagram of the dead time application unit in the present embodiment. The dead time application unit 33 includes the two AND circuits 333a and 333b and the two delay circuits 331a and 331b. The dead time application unit 33 receives the pulse signal X and the pulse signal Y generated by the pulse signal generation unit. The received pulse signal X is divided into two pulse signals X. One of the pulse signals X is delayed by the dead time at the delay circuit 331a and outputted. The other pulse signal X and the pulse signal Y are inputted to the AND circuit 333a. The AND circuit 333a obtains the result of logical conjunction between the pulse signal X and the pulse signal Y, to output a pulse signal in which falling has been advanced by the dead time td. The pulse signal to which the dead time has been applied at falling is inputted to the delay circuit 331b and the AND circuit 333b. The AND circuit 333b obtains the result of logical conjunction between: the pulse signal to which the dead time has been applied at falling; and a pulse signal resulting from delaying the pulse signal by the dead time at the delay circuit 331b. Consequently, the AND circuit 333b outputs a pulse signal Z to which the dead time has been applied at rising and falling (shown in FIG. 11). Thus, the dead time application unit 33 in the present embodiment also applies the dead time to only one of the pair of pulse signals and applies no dead time to the other pulse signal, in the same manner as in embodiment 1. In this manner, the dead time application unit 33 generates: the pulse signal Z to which the dead time has been applied; and the pulse signal X to which the dead time has not been applied. It is noted that the operations in the present embodiment other than the operations of the pulse signal generation unit and the dead time application unit are the same as the operations in the power conversion device according to embodiment 1. That is, in the power conversion device according to the present embodiment as well, the polarity of an output current is detected, and a pulse signal to which the dead time has been applied is selected as a gate signal for an arm that could not be a factor in a voltage error.

The power conversion device configured as described above is such that, in the same manner as in embodiment 1, an output voltage error due to a dead time can be suppressed even if a pulse width in a gate signal is narrowed owing to application of the dead time.

Embodiment 3

As already mentioned, switching between ON and OFF of a semiconductor switching element is not instantly made, and there is a time required for the switching between ON and OFF. A minimum time required for a stable operation of the semiconductor switching element is defined as a minimum operation time. If switching between ON and OFF of the semiconductor switching element is made in a time shorter than the minimum operation time, operation of the semiconductor switching element becomes unstable, and such switching could cause a failure. A power conversion device according to embodiment 3 has a function of enabling prevention of a pulse width in a gate signal from becoming shorter than the minimum operation time even if the pulse width is narrowed owing to application of the dead time.

Figure 12:
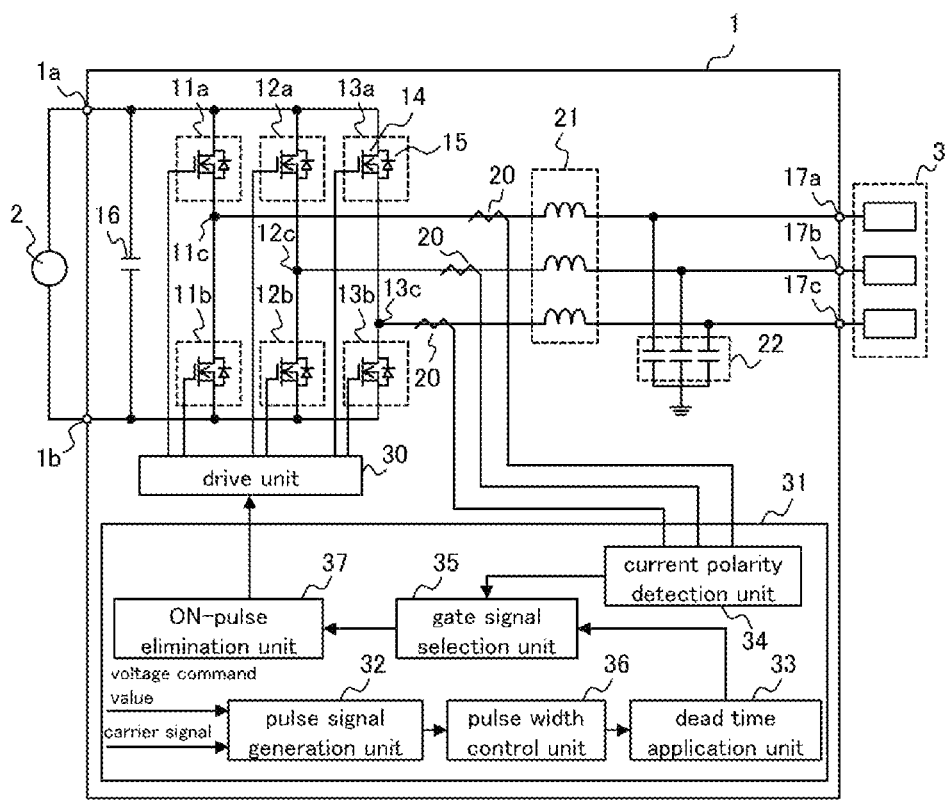
FIG. 12 is a configuration diagram of a power conversion device according to embodiment 3.

FIG. 12 is a configuration diagram of the power conversion device according to the present embodiment. The power conversion device according to the present embodiment includes, as components of the control unit, a pulse width control unit and an ON-pulse elimination unit in addition to the components in the power conversion device according to embodiment 1. The components of the power conversion device according to the present embodiment other than the pulse width control unit and the ON-pulse elimination unit are the same as those in the power conversion device according to embodiment 1.

As shown in FIG. 12, the power conversion device according to the present embodiment includes a pulse width control unit 36 between the pulse signal generation unit 32 and the dead time application unit 33 of the control unit 31. Further, the power conversion device includes an ON-pulse elimination unit 37 on the output side of the gate signal selection unit 35 of the control unit 31. Hereinafter, the pulse width control unit 36 and the ON-pulse elimination unit 37 will be described in detail.

Firstly, the pulse width control unit 36 will be described.

Figure 13A:
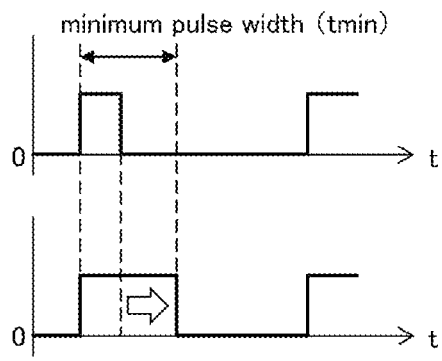
FIG. 13A and FIG. 13B are diagrams showing pulse signals in embodiment 3.
Figure 13B:
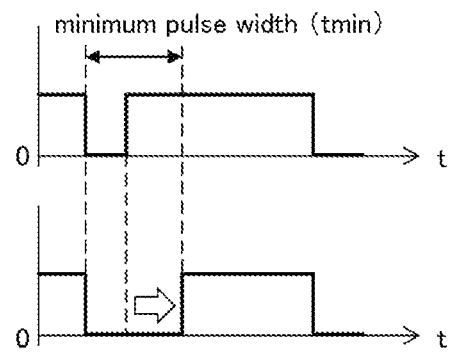

FIG. 13A and FIG. 13B are diagrams showing pulse signals, pulse widths of which are controlled by the pulse width control unit 36. A minimum pulse width (tmin) set by the pulse width control unit 36 is a time resulting from adding the dead time to the minimum operation time. Therefore, if the pulse width before application of the dead time is shorter than the minimum pulse width (tmin), there is a possibility that the pulse width after application of the dead time is shorter than the minimum operation time. In a pulse signal repetitively assuming ON and OFF states, a certain period during which the pulse signal is kept ON is defined as an ON-pulse, and a certain period during which the pulse signal is kept OFF is defined as an OFF-pulse. As shown in FIG. 13A, an ON-pulse having a pulse width shorter than the minimum pulse width is controlled to be an ON-pulse that has been extended to the minimum pulse width. Likewise, as shown in FIG. 13B, an OFF-pulse having a pulse width shorter than the minimum pulse width is controlled to be an OFF-pulse that has been extended to the minimum pulse width.

Figure 14:
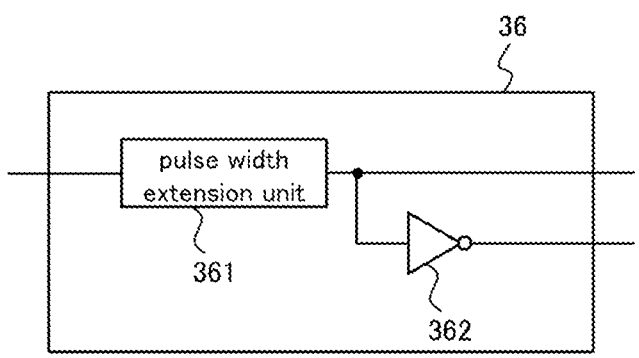
FIG. 14 is a configuration diagram of a pulse width control unit in embodiment 3.

FIG. 14 is a configuration diagram of the pulse width control unit 36. The pulse width control unit 36 includes: a pulse width extension unit 361 which, when a pulse signal having a time width shorter than the minimum pulse width is inputted, extends the pulse width in the pulse signal to the minimum pulse width; and a reversal circuit 362 which reverses a pulse signal resulting from the extension of the pulse width by the pulse width extension unit 361. When a pulse signal having a time width shorter than the minimum pulse width is inputted, the pulse width control unit 36 outputs: a pulse signal resulting from extending the pulse width in the pulse signal to the minimum pulse width; and a pulse signal resulting from reversing the extended pulse signal.

Figure 15A:
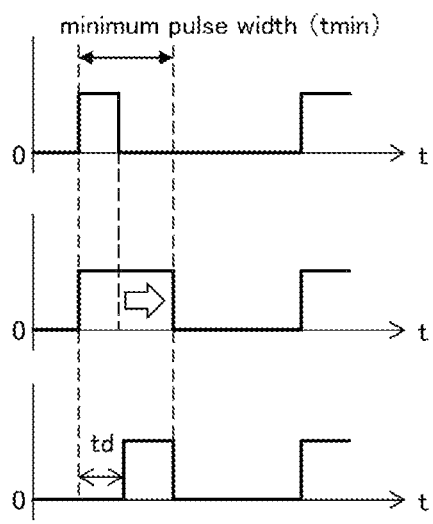
FIG. 15A and FIG. 15B are diagrams showing pulse signals in embodiment 3.
Figure 15B:
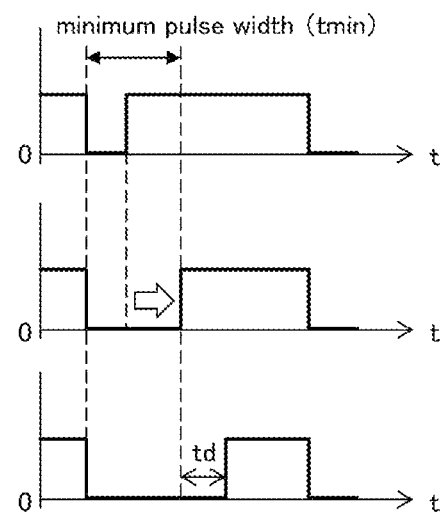

FIG. 15A and FIG. 15B are diagrams showing pulse signals resulting from applying the dead time by the dead time application unit 33 to pulse signals having pulse widths controlled by the pulse width control unit 36. As shown in FIG. 15A, a pulse width of an ON-pulse shorter than the minimum pulse width is extended to the minimum pulse width by the pulse width control unit 36 once, and then rising of the pulse signal is lagged by the dead time td. Meanwhile, as shown in FIG. 15B, a pulse width of an OFF-pulse shorter than the minimum pulse width is extended to the minimum pulse width by the pulse width control unit 36 once, and then rising of the pulse signal that occurs at an ON-pulse when the OFF-pulse ends, is lagged by the dead time td. Therefore, the pulse width of the ON-pulse shorter than the minimum pulse width is controlled by the pulse width control unit 36, and then the dead time td is applied by the dead time application unit 33, whereby the said pulse width results in tmin-td. Meanwhile, the pulse width of the OFF-pulse shorter than the minimum pulse width is controlled by the pulse width control unit 36, and then the dead time td is applied by the dead time application unit 33, whereby the said pulse width results in tmin+td.

Next, the ON-pulse elimination unit 37 will be described.

In the case where the dead time application unit applies the dead time to a pulse signal for turn-on and a pulse signal for turn-off, front and rear parts are eliminated from the pulse width of an ON-pulse by the dead time. Consequently, the pulse width may become equal to or smaller than a pulse width which has been restricted by the pulse width control unit 36. If the pulse width of the ON-pulse becomes shorter than the minimum operation time, operation of the semiconductor switching element might become unstable. The ON-pulse elimination unit 37 eliminates, from the gate signal outputted from the gate signal selection unit 35, the ON-pulse shorter than the minimum operation time.

Figure 16:
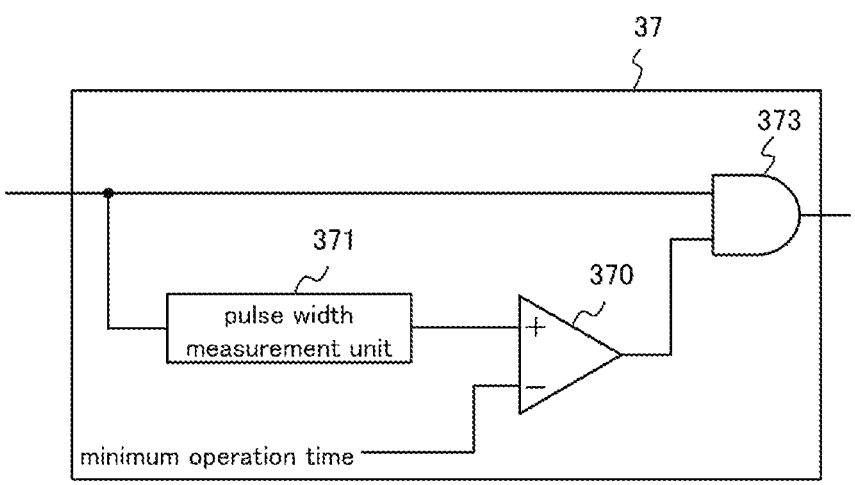
FIG. 16 is a configuration diagram of an ON-pulse elimination unit in embodiment 3.

FIG. 16 is a configuration diagram of the ON-pulse elimination unit 37. The ON-pulse elimination unit 37 includes a pulse width measurement unit 371, a comparator 370, and an AND circuit 373. The pulse width measurement unit 371 measures a pulse width of an ON-pulse in the gate signal outputted from the gate signal selection unit 35. The comparator 370 compares the minimum operation time and the pulse width of the ON-pulse measured by the pulse width measurement unit 371 with each other. If the pulse width is shorter than the minimum operation time, the comparator 370 outputs 0. If the output from the comparator 370 is 0, the AND circuit 373 sets the pulse width of the corresponding ON-pulse to be 0. That is, the ON-pulse elimination unit 37 has a function of, if the pulse width of an ON-pulse is shorter than the minimum operation time, eliminating the ON-pulse from the gate signal.

In the case of providing the ON-pulse elimination unit 37, the gate drive unit drives the semiconductor switching element by means of a pulse signal different from the gate signal outputted from the gate signal selection unit 35. As shown in FIG. 3, if the output current is positive, ON-pulses having short pulse widths are included in the pulse signal for the negative arm, and, if the output current is negative, the ON-pulses are included in the pulse signal for the positive arm. Further, as explained in FIG. 4A and FIG. 4B, if the polarity of the output current is positive, the positive arm could be a factor in a voltage error while the negative arm could not be a factor in a voltage error, and, if the polarity of the output current is negative, the negative arm could be a factor in a voltage error while the positive arm could not be a factor in a voltage error. Therefore, even if an ON-pulse having a pulse width shorter than the minimum operation time is eliminated from the gate signal by the ON-pulse elimination unit 37, the elimination does not influence the output voltage since the gate signal from which the ON-pulse has been eliminated is a gate signal for the arm that could not be a factor in a voltage error.

The power conversion device configured as described above is such that, in the same manner as in embodiment 1, an output voltage error due to a dead time can be suppressed even if a pulse width in a gate signal is narrowed owing to application of the dead time.

Further, the power conversion device according to the present embodiment includes the pulse width control unit and the ON-pulse elimination unit, and a pulse having a pulse width shorter than the minimum operation time can be eliminated from a gate signal, whereby the semiconductor switching element can be prevented from failing.

It is noted that, although the power conversion device according to the present embodiment includes both the pulse width control unit and the ON-pulse elimination unit, the power conversion device only has to include one of the units.

Embodiment 4

In the power conversion devices according to embodiments 1 to 3, the polarity of an output current is detected, and a pulse signal to which the dead time has been applied is selected as a gate signal for an arm that could not be a factor in a voltage error. However, a time zone in which the actual polarity of the output current and the polarity detected by the current polarity detection unit are different from each other, occurs owing to a delay in the current sensor, a computation delay time in the current polarity detection unit, and the like. This time zone might lead to increase in a voltage error. Hereinafter, an instance in which the actual polarity of the output current and the polarity detected by the current polarity detection unit are different from each other is referred to as erroneous determination of the current polarity. The erroneous determination of the current polarity is particularly likely to occur near the current zero-crossing point within a switching cycle at which the current polarity changes between positive and negative polarities. A power conversion device according to embodiment 4 is configured such that: a current polarity within a switching cycle of the semiconductor switching element is detected; in a period during which the current polarity does not change within the switching cycle, the pulse signal to which the dead time has been applied is selected as a gate signal for an arm that could not be a factor in a voltage error; and, in a period during which the current polarity changes within the switching cycle of the semiconductor switching element, gate signals are obtained by applying the dead time at turn-on rising of the respective pulse signals for the positive arm and the negative arm. Hereinafter, an application method (described in embodiment 1) in which the polarity of the output current is detected and the pulse signal to which the dead time has been applied is selected as a gate signal for the arm that could not be a factor in a voltage error, is referred to as a first application method, and an application method in which gate signals are obtained by applying the dead time at turn-on rising of the respective pulse signals for the positive arm and the negative arm, is referred to as a second application method.

Figure 17:
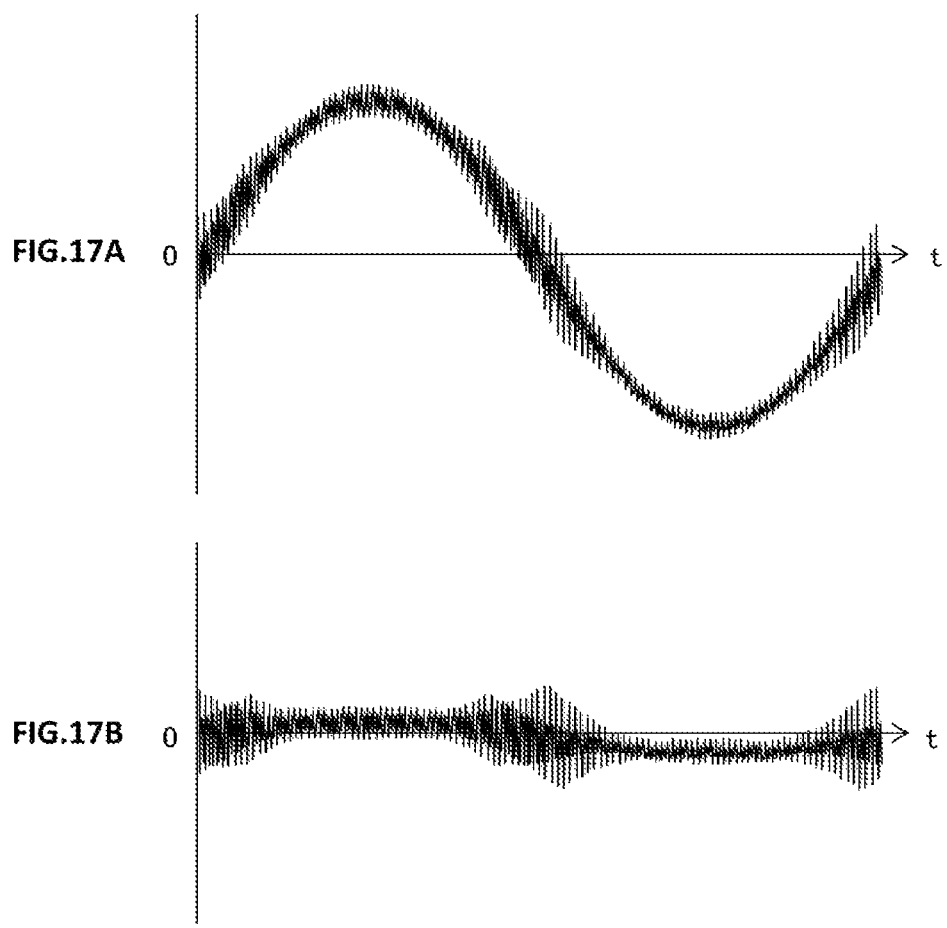
FIG. 17A and FIG. 17B are diagrams showing waveforms of output currents in a power conversion device in embodiment 4.

FIG. 17A and FIG. 17B show waveforms of output currents in the power conversion device according to the present embodiment. FIG. 17A shows an output current obtained when output power takes a rated value. FIG. 17B shows an output current obtained when output power takes a value smaller than the rated value owing to a low load. Output current undergoes a ripple that is dependent on a switching frequency, an output filter, and the like. Thus, a period during which the current polarity changes near the current zero-crossing point within a switching cycle exists regardless of the magnitude of the output power. Further, under the low-load condition shown in FIG. 17B, a smaller effective value of the output current leads to a longer period during which the current polarity changes within the switching cycle. Erroneous determination of the current polarity is likely to occur in such a period during which the current polarity changes within the switching cycle.

Figure 18:
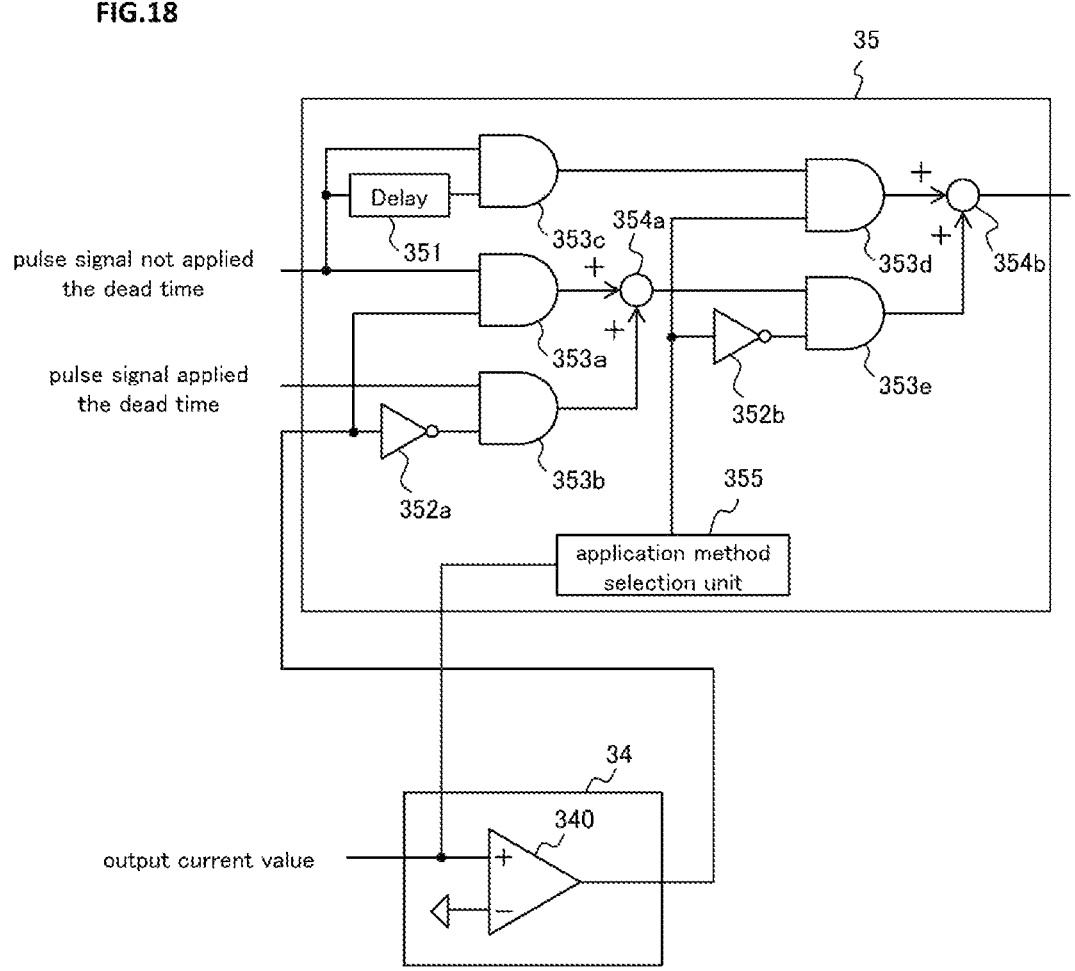
FIG. 18 is a configuration diagram of a current polarity detection unit and a gate signal selection unit in embodiment 4.

FIG. 18 is a configuration diagram of a current polarity detection unit and a gate signal selection unit of the power conversion device according to the present embodiment. The current polarity detection unit 34 in the present embodiment is the same as that in embodiment 1, except that the current polarity detection unit 34 has a function of outputting, to an application method selection unit 355 of the gate signal selection unit 35, an output current value inputted from the current sensor. The gate signal selection unit 35 receives: the pulse signal to which the dead time has been applied and which has been outputted by the dead time application unit; the pulse signal to which the dead time has not been applied and which has been outputted by the dead time application unit; and the output from the current polarity detection unit 34.

The AND circuit 353a of the gate signal selection unit 35 receives: the pulse signal to which the dead time has not been applied; and the output from the current polarity detection unit. The AND circuit 353b receives: the pulse signal to which the dead time has been applied; and the output from the current polarity detection unit reversed by a reversal circuit 352a. An adder 354a adds up the outputs from the two AND circuits 353a and 353b and outputs the sum as a pulse signal. The operations of the AND circuits 353a and 353b, the reversal circuit 352a, and the adder 354a are the same as those in the gate signal selection unit 35 described in embodiment 1 with reference to FIG. 9. Therefore, the pulse signal outputted from the adder 354a corresponds to a pulse signal generated through the first application method.

An AND circuit 353c of the gate signal selection unit 35 receives: the pulse signal to which the dead time has not been applied; and a pulse signal resulting from delaying the same pulse signal by the dead time at a delay circuit 351. The AND circuit 353c obtains the result of logical conjunction between the two received pulse signals, to output a gate signal to which the dead time has been applied at turn-on rising. Therefore, the pulse signal outputted from the AND circuit 353c corresponds to a pulse signal generated through the second application method.

The application method selection unit 355 outputs, on the basis of the output current value, a signal for determining which of the pulse signal generated through the first application method and the pulse signal generated through the second application method is selected as a gate signal. For example, if the first application method is selected, the application method selection unit 355 outputs 0, and, if the second application method is selected, the application method selection unit 355 outputs 1. Determination as to which application method is selected by the application method selection unit 355 will be described later.

An AND circuit 353d receives: the pulse signal outputted from the AND circuit 353c; and the output from the application method selection unit 355. The AND circuit 353d outputs the result of logical conjunction between these two received signals. An AND circuit 353e receives: the pulse signal outputted from the adder 354a; and a signal resulting from reversing the output from the application method selection unit 355 by a reversal circuit 352b. The AND circuit 353e outputs the result of logical conjunction between these two received signals. An adder 354b adds up the outputs from the two AND circuits 353d and 353e and outputs the sum as a gate signal. The gate signal selection unit 35 shown in FIG. 18 is provided correspondingly to each arm. It is noted that the gate signal selection unit 35 shown in FIG. 18 is adapted to the positive arm, and, in a gate signal selection unit adapted to the negative arm, the reversal circuit 352a is provided not on the AND circuit 353b side but on the AND circuit 353a side.

Figure 19:
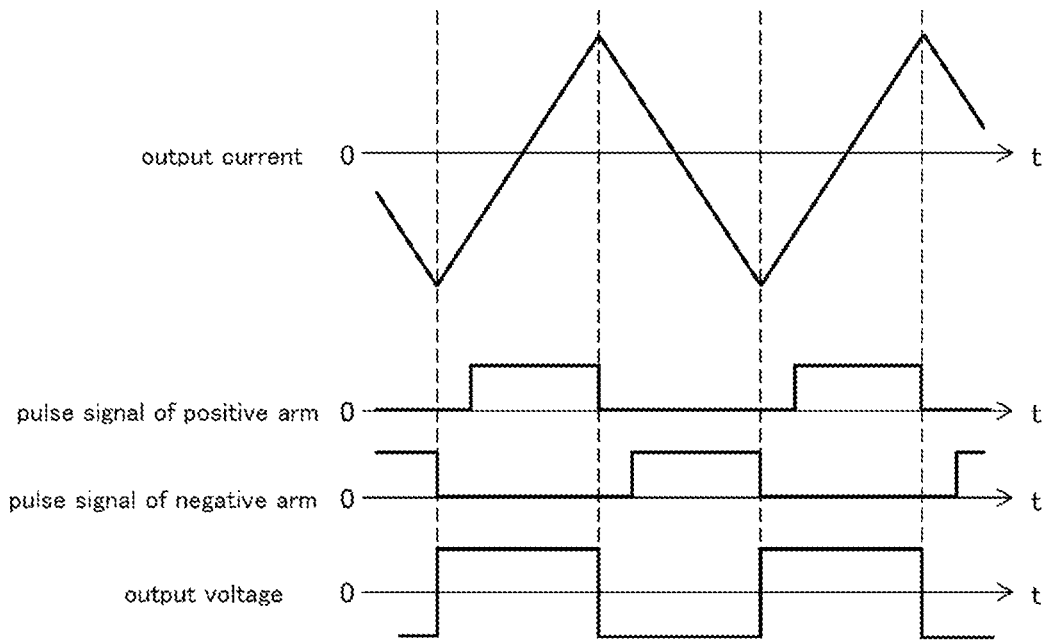
FIG. 19 is a diagram showing an output current, pulse signals, and an output voltage in embodiment 4.

FIG. 19 is a diagram explaining the relationship between an output current, a pulse signal for the positive arm, a pulse signal for the negative arm, and an output voltage in a period during which the current polarity changes within the switching cycle. As shown in FIG. 19, the output voltage changes at falling of each of the pulse signals for the positive arm and the negative arm in the period during which the current polarity changes within the switching cycle. Thus, even if the dead time is applied at rising of each of the pulse signals for the positive arm and the negative arm, no voltage error occurs. Therefore, as far as the period during which the current polarity changes within the switching cycle is concerned, it is more preferable to obtain, as gate signals, pulse signals resulting from applying the dead time at turn-on rising of the respective pulse signals for the positive arm and the negative arm than to select a pulse signal, to which the dead time has been applied, as a gate signal for an arm that could not be a factor in a voltage error, through detection of the polarity of the output current.

For this reason, the application method selection unit 355 distinguishes, on the basis of the output current value, a period during which the current polarity changes within a switching cycle and the other period within the switching cycle. Then, in the period during which the current polarity changes within the switching cycle, the application method selection unit 355 selects the pulse signal generated through the second application method as a gate signal, and, in the other period within the switching cycle, the application method selection unit 355 selects the pulse signal generated through the first application method as a gate signal. That is, in the period during which the current polarity changes within the switching cycle, the application method selection unit 355 outputs a signal for selecting the pulse signal outputted from the AND circuit 353c, and, in the other period within the switching cycle, the application method selection unit 355 outputs a signal for selecting the pulse signal outputted from the adder 354a.

In the power conversion device configured as described above, increase in the voltage error due to erroneous determination of the current polarity can be suppressed in the period during which the current polarity changes within the switching cycle.

Figure 20:
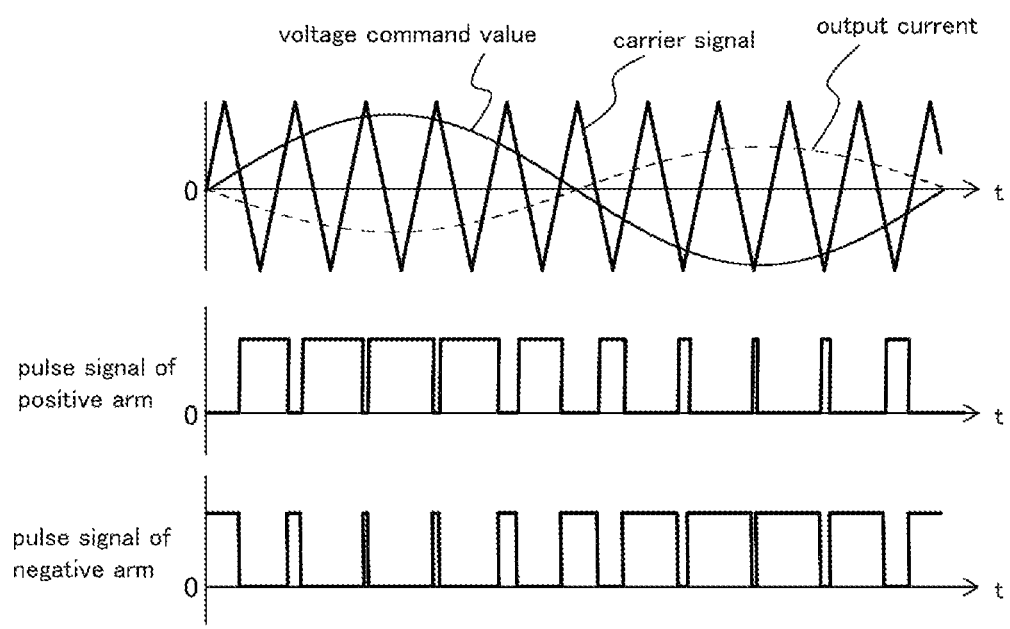
FIG. 20 is a diagram showing pulse signals in embodiment 4.

FIG. 20 is a diagram showing: a voltage command value, a carrier signal, and an output current in a regenerative behavior operation; and a pulse signal for the positive arm and a pulse signal for the negative arm in the regenerative behavior operation. In the regenerative behavior operation, the polarity of the voltage command value and the polarity of the output current are opposite to each other. The regenerative behavior operation and a low-power-factor operation with a power factor being smaller than 0.8 are, for example, such that, in the case where the current polarity is positive, the positive arm that could not be a factor in a voltage error due to the dead time undergoes a voltage error not at an OFF-pulse having a short pulse width but at an ON-pulse having a short pulse width. In such operations, the voltage error can be suppressed also if the pulse signal generated through the second application method is selected as a gate signal. Therefore, the necessity of selecting, as a gate signal, the pulse signal generated through the first application method described in embodiment 1 is lower than under the condition of the operation with a power factor being 1. In this manner, use of the power conversion device according to the present embodiment makes it possible to select, as a gate signal, either of the pulse signal generated through the first application method and the pulse signal generated through the second application method even under a condition of operations such as the regenerative behavior operation and the low-power-factor operation with a power factor being smaller than 0.8.

Figure 21:
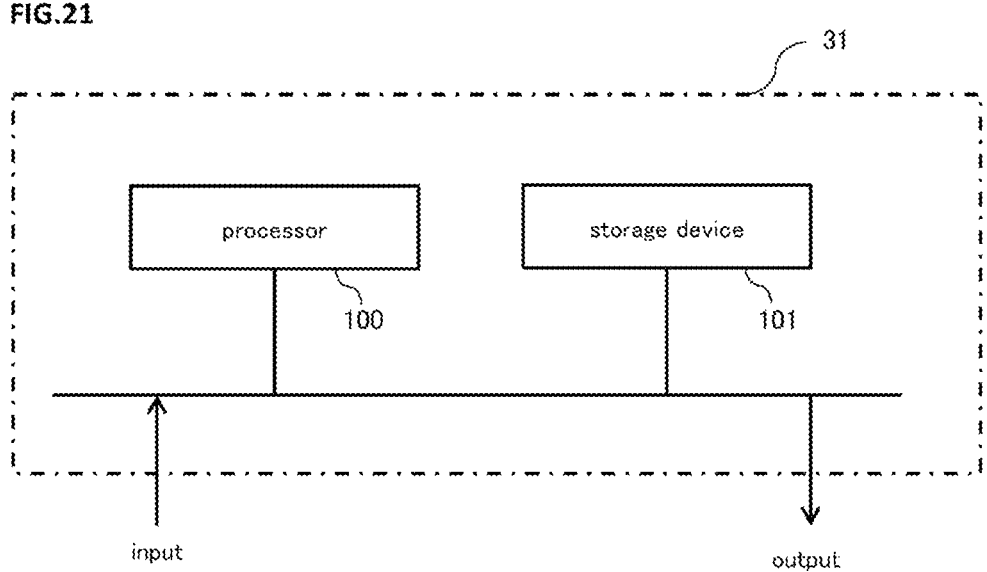
FIG. 21 schematically shows a hardware example of a control unit in each of embodiments 1 to 4.

It is noted that the control unit 31, a hardware example of which is shown in FIG. 21, of each of the power conversion devices according to embodiments 1 to 4 may be composed of a processor 100 and a storage device 101. Although not shown, the storage device 101 includes a volatile storage device such as a random access memory and a nonvolatile auxiliary storage device such as a flash memory. Alternatively, the storage device 101 may include, as the auxiliary storage device, a hard disk instead of a flash memory. The processor 100 executes a program inputted from the storage device 101. In this case, the program is inputted from the auxiliary storage device via the volatile storage device to the processor 100. Further, the processor 100 may output data such as a calculation result to the volatile storage device of the storage device 101 or may save the data via the volatile storage device to the auxiliary storage device. The control unit configured as described above executes, by means of a program, the operations described using logic circuits and the like in embodiments 1 to 4.

Although the disclosure is described above in terms of various exemplary embodiments, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the technical scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS 1 power conversion device
2 DC power supply 3 load
1a positive input terminal
1b negative input terminal
11a, 12a, 13a positive arm
11b, 12b, 13b negative arm
11c, 12c, 13c connection point
14 semiconductor switching element
15 flyback diode
16 capacitor
17a, 17b, 17c output terminal
20 current sensor
21 filter reactor
22 filter capacitor
30 gate drive unit
31 control unit
32 pulse signal generation unit
33 dead time application unit
34 current polarity detection unit
35 gate signal selection unit
36 pulse width control unit
37 ON-pulse elimination unit
100 processor
101 storage device
320, 340, 370 comparator
331a, 331b, 331c, 351 delay circuit
332, 352, 352a, 352b, 362 reversal circuit
333a, 333b, 353a, 353b, 353c, 353d, 353e, 373 AND circuit
354, 354a, 354b adder
355 application method selection unit
361 pulse width extension unit
371 pulse width measurement unit

The invention claimed is:

1. A power conversion device comprising:
a positive input terminal and a negative input terminal connected to an external DC power supply;
a positive arm and a negative arm connected in series between the positive input terminal and the negative input terminal, each of the positive arm and the negative arm including a semiconductor switching element and a diode connected in antiparallel to the semiconductor switching element;
an output terminal connected to a connection point between the positive arm and the negative arm;
a current detection circuitry to detect an output current outputted to the output terminal;
a drive circuitry to drive the semiconductor switching element of each of the positive arm and the negative arm by means of a gate signal; and
a control circuitry to control the gate signal, wherein the control circuitry includes
a pulse signal generation circuitry to generate a pulse signal on the basis of a voltage command value and a carrier signal,
a dead time application circuitry to add a time width of a dead time to, or subtract the time width from, a pulse width in one pulse signal out of the pulse signal generated by the pulse signal generation circuitry and a pulse signal resulting from reversing the pulse signal, to apply the dead time to only the one pulse signal,
a current polarity detection circuitry to detect, on the basis of the output current detected by the current detection circuitry, a polarity of the output current, and
a gate signal selection circuitry to, if the polarity of the output current detected by the current polarity detection circuitry is positive, select the one pulse signal as a gate signal for the positive arm and select another one of the pulse signals as a gate signal for the negative arm, and, if the polarity of the output current detected by the current polarity detection circuitry is negative, select the one pulse signal as the gate signal for the negative arm and select the other pulse signal as the gate signal for the positive arm.

2. The power conversion device according to claim 1, wherein
the control circuitry further includes a pulse width control circuitry to, if a pulse width of a pulse included in the pulse signal generated by the pulse signal generation circuitry is narrower than a preset minimum pulse width, perform pulse width control to extend the pulse width of the pulse to the minimum pulse width.

3. The power conversion device according to claim 1, wherein
the control circuitry further includes an ON-pulse elimination circuitry to, if a pulse width of an ON-pulse included in the gate signal selected by the gate signal selection circuitry is shorter than a preset minimum operation time, eliminate the ON-pulse from the gate signal.

4. The power conversion device according to claim 1, wherein
the dead time application circuitry delays the other pulse signal by the dead time.

5. The power conversion device according to claim 1, wherein
the pulse signal generation circuitry generates
a first pulse signal resulting from comparison between the voltage command value and the carrier signal and
a second pulse signal resulting from comparison between the voltage command value and a second carrier signal resulting from advancing a phase of the carrier signal by the dead time, and
the dead time application circuitry uses the first pulse signal and the second pulse signal to obtain, as the one pulse signal, a pulse signal resulting from applying the dead time to the first pulse signal.

6. The power conversion device according to claim 1, wherein
the gate signal selection circuitry
generates a pulse signal to which the dead time has been applied at turn-on rising, the pulse signal being generated for each of the positive arm and the negative arm by using the other pulse signal, and
selects, as a gate signal for each of the positive arm and the negative arm, the pulse signal to which the dead time has been applied at the turn-on rising, the selection being performed in a period during which the polarity of the output current changes within a switching cycle of the semiconductor switching element.

7. The power conversion device according to claim 1, wherein
the gate signal selection circuitry
generates a pulse signal to which the dead time has been applied at turn-on rising, the pulse signal being generated for each of the positive arm and the negative arm by using the other pulse signal, and
selects, as a gate signal for each of the positive arm and the negative arm, the pulse signal to which the dead time has been applied at the turn-on rising, the selection being performed if a polarity of the voltage command value and the polarity of the output current are different from each other.

* * * * *